May 5, 1964 — M. YOUNG — 3,131,864
AUTOMOBILE PREHEATER
Filed Oct. 5, 1962 — 2 Sheets-Sheet 1

INVENTOR.
MARION YOUNG
BY Kimmel & Crowell
ATTORNEYS.

United States Patent Office 3,131,864
Patented May 5, 1964

3,131,864
AUTOMOBILE PREHEATER
Marion Young, Little Rock, Ark.
Filed Oct. 5, 1962, Ser. No. 228,657
1 Claim. (Cl. 237—8)

This invention relates to an automobile preheater and relates more particularly to a heater designed to preheat the engine block of an automobile and to simultaneously heat the interior of the automobile and defrost the windshield.

It is common experience to have an automobile engine fail to start in cold weather. Moreover, even if the engine will turn over it is well known that the engine efficiency does not reach optimum until the functional parts are heated to their normal operating temperature. Most driver's handbooks will advise allowing the automobile to idle for at least five minutes after the engine has been started on cold mornings and to further make no fast starts or stops until the engine temperature has increased through operation. It is readily apparent that it would be greatly advantageous to have a device which would insure immediate starting of an automobile engine even in the coldest weather, thereby improving the dependability and efficiency of the automobile.

It is also common in cold weather that the interior of the automobile will remain below a comfortable temperature for the driver and occupants until the engine has been brought up to normal operating temperature so that the heating system can provide excess heat given off by the engine block to the interior of the car. Likewise, on particularly cold mornings, the automobile windshield will be frosted and will require either scraping before the automobile may be operated or waiting until the defroster system can provide sufficient heat to clear the windshield. A device which would preheat the interior of the automobile and at the same time defrost the windshield would greatly add to the comfort, expediency and safety of the operator.

It is therefore an object of this invention to provide a device which will preheat the engine block of an automobile thereby insuring instantaneous starting and optimum efficiency even in cold weather.

It is a further object of this invention to provide a device of this character which includes means to heat the interior of the automobile and defrost the windshield so that the automobile will be at a comfortable temperature and ready for use on a cold winter morning.

Another object of this invention is the provision of such a device whereby a gas burning heater is installed under the hood of the automobile with a container of pressurized gas placed in some convenient location such as the trunk.

Another object of the instant invention is to provide a device which will automatically ignite such a gas burning heater at a predetermined time and pump the fluid from the engine block cooling system into heat-exchange relationship with said heater while simultaneously providing heated fluid to the automobile heating and defrosting system.

A still further object of this invention is the provision of a gas burning heater of this type having means to automatically stop the flow of gas from the pressurized source if the burner flame goes out for any reason.

Another object of the instant invention is the provision of such a device which is operable either automatically by a timing mechanism or alternatively by a switch on the automobile dashboard.

Other and further objects reside in the combination of elements, arrangement of parts, and features of construction.

Still other objects will in part be obvious, and in part be pointed out, as the description of the invention proceeds and as shown in the accompanying drawings wherein there is disclosed preferred embodiments of this inventive concept.

In the drawing.

Similar reference characters refer to similar parts throughout the several views of the drawing.

Figure 1:
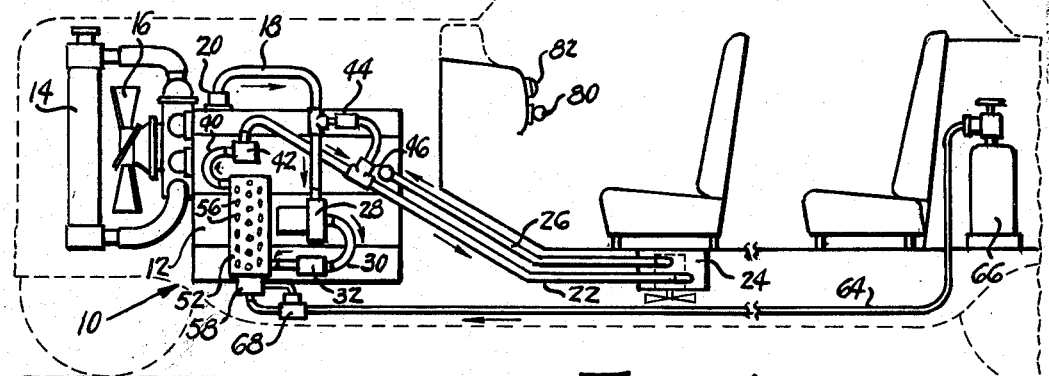
FIGURE 1 is a schematic plan view of a preferred embodiment of this invention showing the relationship of the preheater to the other elements in an ordinary automobile.

Referring now to the drawings in detail and particularly to FIGURE 1, reference number 10 indicates generally the preheater of the instant invention. The major portion thereof will be seen to be located under the hood of the automobile in juxtaposition to the engine block 12. The radiator 14 and associated fan 16 will be seen connected to the engine block to provide the conventional cooling system. A conduit means 18 is connected to the engine block 12 as at 20 and fluid normally passes to the heater conduit 22 through the gate valve 44 which bypasses the fluid when the preheater of the instant invention is not in use to the car heater 24 and back to the engine block through the return conduit 26. The car heater 24 normally has a motor and a fan adapted to blow air heated by the fluid traveling through the conduits 22 and 26 under normal operation of the automobile engine into the interior of the car to supply heat thereto and against the windshield to defrost the same.

When the device of the instant invention is operative the fluid coming from the conduit 18 will be first by-passed through the pump 28, the conduit 30 and the switch 32, the function of which will be further described hereinafter, into the heating unit at 34. Note FIGURE 2. The fluid then passes through a plurality of coils 36 and exits from the heating unit at 38. The conduit 40 carries the heated fluid through the thermostat 42 and returns the same to the heater conduit 22 at 46.

Figure 2:
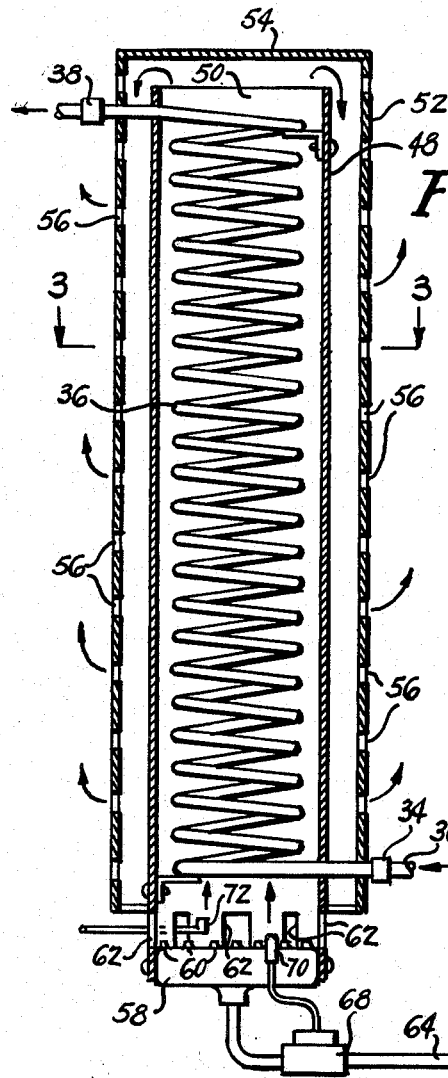
FIGURE 2 is a longitudinal cross-sectional view of an automobile preheater in accordance with the instant invention.
Figure 3:
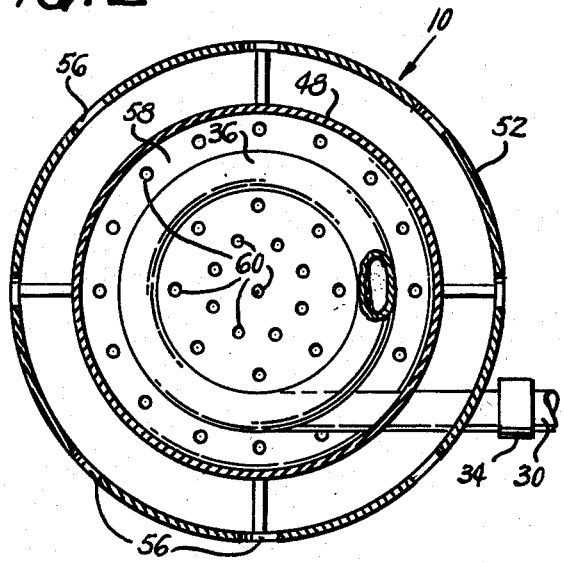
FIGURE 3 is a transverse cross-sectional view taken along line 3—3 of FIG. 2 to a larger scale.

The heating unit can be seen more clearly in FIGS. 2 and 3 and consists of a first cylindrical member 48 circumscribing the coils 36 and having an opened top at 50. A second cylindrical member 52 is concentric with and spaced outwardly from the first cylindrical member 48 and has a top cover portion 54 and a plurality of circumferentially spaced holes 56.

The burner unit shown generally at 58 is within the bottom portion of the first cylindrical member 48 and has a plurality of gas jets 60 in juxtaposition to the bottom of the coils 36. A number of draft ports 62 are provided in the bottom portion of the first cylindrical member 48 to allow for the passage of air. A gas conduit 64 is connected to a pressurized gas tank 66 placed in the trunk or some other convenient location. Note FIG. 1. A gas valve 58 is operatively placed in the gas conduit 64 between the gas tank 66 and the burner 58. The valve 68 controls the amount of gas fed to the burner 58 and has means 70 to automatically shut off the gas flow in the event the flame is extinguished. These means will be more fully explained hereinafter.

A spark electrode 72 is energized when the gas valve 68 is first opened to ignite the gas emanating from the jets 60.

Figure 4:
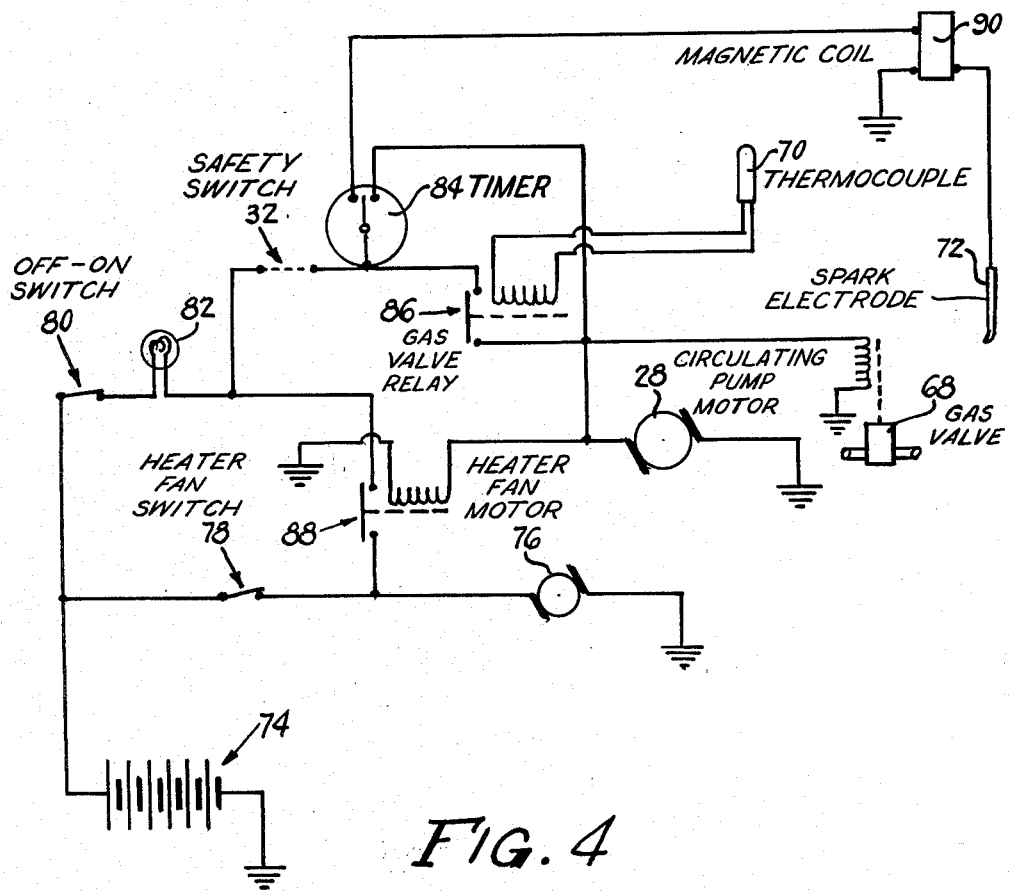
FIGURE 4 is a schematic showing of the electrical system to be used with the automobile preheater of the instant invention.

Reference is now made to FIGURE 4 for an explanation of the electrical system of the preheater of the instant invention. Although a special source of electrical energy can be supplied it is preferable to use the ordinary 12 volt battery of the automobile indicated by the reference numeral 74. Under normal operation the battery will supply power to the heater fan motor 76, when the heater fan switch indicated at 78 is in the closed position. The heater fan will then circulate hot air to the interior of the car and to the defroster system.

An "off-on" switch is provided for the preheater of the instant invention and is indicated by the reference number 80. An indicator light 82 is included in the circuit and is located on the dashboard with the "off-on" switch to show the driver that the preheater is in operation. When the device of the instant invention is switched to the "on" position, energy will be conducted through the switch 32 and the timer 84 to the gas valve relay 86. When the points of the gas valve relay 86 are energized current is furnished to the solenoid which opens the gas valve at 68, to the circulating pump motor at 28, and to the fan relay at 88 which furnishes current to the heater fan motor 76.

When the timer is actuated the timer points are energized for 60 seconds and current flows through the magnetic coil 90 which has vibrating points furnishing current to the spark electrode 72 to ignite the gas jets 60.

The means shown at 70 function as a thermocouple and when heated will close the points in the gas valve relay 86 thus holding the gas valve open. If the heat flowing from the jets 60 is for any reason stopped, for example, if the flames are somehow extinguished, the thermocouple 70 will allow the points of the gas valve relay 86 to open thereby automatically stopping the flow of energy to the gas valve 68. Spring actuated means (not shown) will close the gas valve when its energy is stopped.

It is to be noted that the timer 84 has two sets of points. They come on and off at the same time. One set of points furnishes current to the magnetic coil 90 and to the spark electrode 72. The other set of points furnishes current to the gas valve relay 86. This is for safety purposes. If the fire is not established the timer will go off within sixty seconds, closing the gas valve 68. If the fire is established, the thermocouple 70 will close the points on gas valve relay 86 and will hold the gas valve 68 open.

The switch 32 is located between the circulating pump 28 and the coil 36 and serves as a safety device to shut off the entire system in the event of overheating. The system can only be started again by manual setting.

The thermostat 32 is located between the outlet 38 of the coil and the heater conduit 22 functions to hold the flow of fluid static until it reaches a temperature of 110° F., and then opens to allow the water to circulate.

The use and operation of this device will now be set forth in detail. A small tank, approximately 2 gallons, of the heating gas, preferably propane, will be located in the trunk of the car or under the hood of the car, as desired. A pressure gauge on the tank will indicate the remaining supply of gas. If the weather is such that it may be expected to be cold overnight, the timer can be set so that the device will be initiated automatically approximately 30 mintues before the automobile will be used. However, the preheater can be initiated at any time by pressing the "off-on" switch 80 on the dashboard of the car. This will energize the indicator light 82 and transfer current through the switch 32 to the gas valve relay 86 which will automatically open the gas valve 68, energize the circulating pump 28 and close the points on the heater fan relay 88 to supply current to the heater fan motor 76. The timer points will also provide current to the magnetic coil 90 thereby actuating the spark electrode 72 to light the gas jets 60 at the base of the burner 58. The pump 28 will withdraw fluid from the normal heater cycle and pass the same through the coil 36 to be heated by the burner 58. Once the desired temperature has been reached, the thermostat 42 will allow the fluid to circulate through the heating system at 24 by way of the heater conduit 22 and back to the engine block 12 through the return conduit 26. After the hot fluid passes through the engine block 12 it will be returned to the system via the conduit 18.

Excess heat given off by the burner 58 will pass along the coils 36 through the open top 50 of the first cylindrical member 48 and down the space between the two cylindrical members 48 and 52. The heat will be dissipated through the plurality of spaced holes 56 in the latter member thereby heating the remainder of the engine by convection as shown by the arrows in FIGURE 2.

When the engine and the interior of the car have been sufficiently preheated the device of the instant invention may be rendered inoperative by the "off-on" switch 80.

If the preheater overheats switch 32 will automatically cut off the power to the entire unit, stopping the pump 28 and closing the gas valve 68. The flow of gas will also be stopped by the thermocouple 70 if the burner is otherwise extinguished.

From the foregoing it will now be seen herein provided a novel preheater which is so designed that it will automatically preheat the engine block of an automobile and the interior thereof while defrosting the windshield on cold winter mornings.

It is further seen that there is provided a device which accomplishes all of the objects of this invention and others, including many advantages of great practical utility and commercial importance. Since many embodiments may be made of this inventive concept and since many modifications may be made in the embodiments herein shown and described, it is to be understood that all matter herein is to be interpreted as merely illustrative and not in a limiting sense.

I claim:

In an automobile having an engine including a block, a fluid containing radiator, fluid connections between said radiator and said block, a battery, and a body, a preheater for said block positioned adjacent thereto, a fluid containing coil in said preheater having a bottom inlet line and a top outlet line, a burner at the bottom of said preheater, a bottled gas fuel tank in said body, a fuel line connecting said fuel tank to said burner, a solenoid control valve in said fuel line, a fluid conduit leading from said engine block, a bypass gate valve in said fluid conduit, a car heater including an electric fan in said body, a first car heater supply line extending to said heater through said bypass valve, a return line extending from said car heater to said block, a second preheater supply line extending from said gate valve, a pump in said preheater supply line connected to said preheater bottom inlet line, a heat fusible safety switch in said bottom inlet line, a thermostatically controlled valve in said outlet line, a second car heater supply line connecting said outlet line to said first car heater supply line, a thermostat operatively connected between said outlet line and said first car heater supply line, an electrical circuit connected to said battery and including main power supply line, a first fan supply line connecting said main line to said fan, a manual switch in said first fan supply line, a line extending to said fan, a main manual switch for said preheater in asid main line, an indicator light in said main line, an electric timer having two simultaneously operable sets of points, a connecting line between said main line and said timer, said fusible safety switch being positioned in said connecting line, a spark electrode adjacent to said burner, a line connecting said electrode to one set of points of said timer, a magnetic coil for said electrode in said last-mentioned line, a line extending from the other of said sets of points to said pump, a second fan supply line connected to said main line, a solenoid actuated switch in said second line, a solenoid energizing line connected to said line extending to said pump, a line extending from said timer to the solenoid actuating said valve in said fuel line, a solenoid actuated switch in said line extending from said timer to the solenoid actuating the fuel valve, a thermocouple adjacent said burner and an actuating connection between said thermocouple and said last-mentioned solenoid actuated switch.

References Cited in the file of this patent

UNITED STATES PATENTS

| | | |
|---|---|---|
| 1,236,416 | Fink | Aug. 14, 1917 |
| 2,021,569 | Pasco | Nov. 19, 1935 |
| 2,046,812 | Danuser et al. | July 7, 1936 |
| 2,179,322 | Brown | Nov. 7, 1939 |
| 2,495,857 | Massare | Jan. 31, 1950 |

FOREIGN PATENTS

| | | |
|---|---|---|
| 110,466 | Sweden | Apr. 25, 1944 |